(12) United States Patent
Kibben et al.

(10) Patent No.: US 9,586,545 B2
(45) Date of Patent: Mar. 7, 2017

(54) BUMPER FOR A MOTOR VEHICLE

(71) Applicant: THYSSENKRUPP STEEL EUROPE AG, Duisburg (DE)

(72) Inventors: Martin Kibben, Dinslaken (DE); Rolf Peter Röttger, Mülheim (DE); Markus Zörnack, Lake Orion, MI (US)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 14/778,579

(22) PCT Filed: Feb. 14, 2014

(86) PCT No.: PCT/EP2014/052908
§ 371 (c)(1),
(2) Date: Sep. 18, 2015

(87) PCT Pub. No.: WO2014/146835
PCT Pub. Date: Sep. 25, 2014

(65) Prior Publication Data
US 2016/0264081 A1    Sep. 15, 2016

(30) Foreign Application Priority Data

Mar. 19, 2013 (DE) .................. 10 2013 102 818

(51) Int. Cl.
*B60R 19/12* (2006.01)
*B60R 19/18* (2006.01)
(Continued)

(52) U.S. Cl.
CPC .............. *B60R 19/12* (2013.01); *B60R 19/03* (2013.01); *B60R 19/18* (2013.01); *B60R 19/34* (2013.01); *B60R 2019/1826* (2013.01)

(58) Field of Classification Search
CPC ......... B60R 19/12; B60R 19/03; B60R 19/34; B60R 19/18; B60R 2019/1826
(Continued)

(56) References Cited

U.S. PATENT DOCUMENTS 7,287,788 B2 * 10/2007 Caliskan .............. B62D 21/152
293/102
8,511,745 B2 * 8/2013 Baldwin ................. B60R 19/34
188/374

(Continued)

FOREIGN PATENT DOCUMENTS

DE    102 48 637 A1    5/2004
DE    10319716 A1    11/2004
(Continued)

OTHER PUBLICATIONS

English language Abstract for DE 103 39 949 A1 listed above.
(Continued)

*Primary Examiner* — Pinel Romain
(74) *Attorney, Agent, or Firm* — thyssenkrupp North America, Inc.

(57) ABSTRACT

The invention relates to a bumper for a motor vehicle, in particular a front bumper, having at least two deformation bodies which are at a distance from one another and of which the center or longitudinal axes, in the mounted state, are oriented substantially parallel to the direction of travel of the motor vehicle, and having a plurality of crossmembers which have a closed profile and which are arranged one above the other and are connected to the deformation bodies. The crossmembers are formed from a group of at least three crossmembers, wherein the respective crossmember of the group has a cross-sectional profile which comprises at least five corners.

10 Claims, 4 Drawing Sheets

(51) Int. Cl.
  *B60R 19/03*   (2006.01)
  *B60R 19/34*   (2006.01)
(58) Field of Classification Search
  USPC .................................................. 296/133, 134
  See application file for complete search history.

(56)           References Cited

U.S. PATENT DOCUMENTS

| 2004/0135381 | A1  | 7/2004 | Reutlinger et al. |
| 2005/0116498 | A1  | 6/2005 | Kobayashi |
| 2012/0153645 | A1  | 6/2012 | Roll et al. |
| 2015/0021940 | A1* | 1/2015 | Roselli ................... B60R 19/34 293/133 |
| 2015/0115572 | A1* | 4/2015 | Kim ....................... B21D 53/88 280/500 |

FOREIGN PATENT DOCUMENTS

| DE | 103 39 949    A1 | 3/2005 |
| DE | 102004056956  A1 | 7/2005 |
| EP | 2322387       A1 | 5/2011 |
| JP | 2002029337    A  | 1/2002 |
| JP | 2004 262300   A  | 9/2004 |
| WO | 2010008217    A2 | 1/2010 |

OTHER PUBLICATIONS

English Translation of International Preliminary Report on Patentability (Chapter II of the PCT) for PCT/EP2014/052908.
German Language International Search Report for International patent application No. PCT/EP2014/052908; mailing date Mar. 13, 2014.
English translation of International Search Report for International patent application No. PCT/EP2014/052908; mailing date Mar. 13, 2014.
Anonymous: "Bumper integrated vehicle compatibility beam", Research Disclosure, Mason Publications, Hampshire, GB, vol. 475. No. 75. Nov. 1, 2003 (Nov. 1, 2003), XP007133123, ISSN: 0374-4353.
English abstract for JP 2004 262300 A.
English abstract for JP 2002 029337 A.
English abstract for DE 10319716 A1.
German language Written Opinion of ISA (the EPO) for PCT/EP2014/052908.
German language International Preliminary Examination Report (IPER) for PCT/EP2014/052908.

* cited by examiner

BUMPER FOR A MOTOR VEHICLE

CROSS REFERENCE TO RELATED APPLICATIONS

This application is a U.S. National Stage Entry of International Patent Application Serial Number PCT/EP2014/052908, filed Feb. 14, 2014, which claims priority to German patent application no. DE 102013102818.7 filed Mar. 19, 2013, the entire contents of both of which are incorporated herein by reference.

FIELD

The invention relates to a bumper for a motor vehicle, in particular a front bumper, having at least two deformation bodies which are at a distance from one another and of which the center or longitudinal axes, in the mounted state, are oriented substantially parallel to the direction of travel of the motor vehicle, and having a plurality of crossmembers which have a closed profile and which are arranged one above the other and are connected to the deformation bodies (so-called crash boxes).

BACKGROUND

A bumper of this kind is known from DE 10 2004 056 956 B4. The known bumper has at least two round pipes as crossmembers which are arranged one above the other in the vertical direction and are connected to one another by a plate-like bracket between the side frames (crash boxes). In this case, the bracket is provided on the front side of the pipes and welded to said pipes. Said bracket has upper and lower bent end sections which are matched to the outer shape of the pipes. The pipes are connected to the side frames by means of carrier elements which have arcuate cutouts for receiving the pipes in an interlocking manner.

The majority of collisions between passenger cars occur at speeds of below 20 km/h. This results in damage to the front and rear of the vehicle. In the past, crash repair tests with the aim of reducing the damage to passenger cars in the event of typical collisions were developed in the insurance sector. Nowadays, automobile insurers classify passenger cars according to type on the basis of these tests, amongst other things. Automobile manufacturers take this test into account when developing new models. However, minimizing the damage to a vehicle in the event of collisions requires the bumpers of the vehicles which are involved in the collision to be geometrically compatible. Since the crossmembers of the bumpers are relatively narrow and arranged at different heights, this results in it being possible that the bumpers do not meet and slip into or enter the soft regions of the other vehicle. In these cases, the repair costs can be considerably higher than in the case of vehicles of which the bumpers meet and absorb the impact energy as intended.

However, even if the bumpers get in contact, it is additionally important for the purpose of minimizing the damage to the vehicles that the backward displacement (deformation) of the crossmember of the bumper which is caused by the impact does not exceed a certain level, for example 100 mm, since otherwise the motor assembly, in particular the radiator, is damaged. To date, conventional motor vehicle bumpers have generally not been designed to meet this requirement.

A further requirement when developing new motor vehicles is to minimize the weight of the vehicle in order to reduce fuel consumption. For this reason, bumpers which are composed of aluminum are incorporated into many motor vehicles. Although these bumpers have a relatively low weight, they have the disadvantage of relatively high material costs.

SUMMARY

An object of the present disclosure is to disclose a bumper for a motor vehicle having at least two deformation bodies that are at a distance from one another, and of which the center or longitudinal axes, in the mounted state, are oriented substantially parallel to the direction of travel of the motor vehicle, and having a plurality of crossmembers which have a closed profile and which are arranged one above the other and are connected to the deformation bodies (so-called crash boxes). A crossmember of a bumper disclosed herein provides a relatively high deformation resistance, so that a deliberately limited backward displacement of the crossmembers is achieved in the event of a collision at speeds of less than 20 km/h and the bumper of the other vehicle which is involved in the collision largely does not underrun or overrun the bumper. At the same time, the bumper should have a relatively low weight.

BRIEF DESCRIPTION OF THE DRAWINGS

The present disclosure is described in detail below with reference to the attached drawing figures, wherein:

FIG. 5a-7 are cross sectional views through various alternate embodiments of crossmembers of a bumper of the present disclosure, the crossmembers having a first set of cross members arranged one above the other and having additional cross members disposed either in front of or behind the first set of cross members.

DETAILED DESCRIPTION

Figure 1:
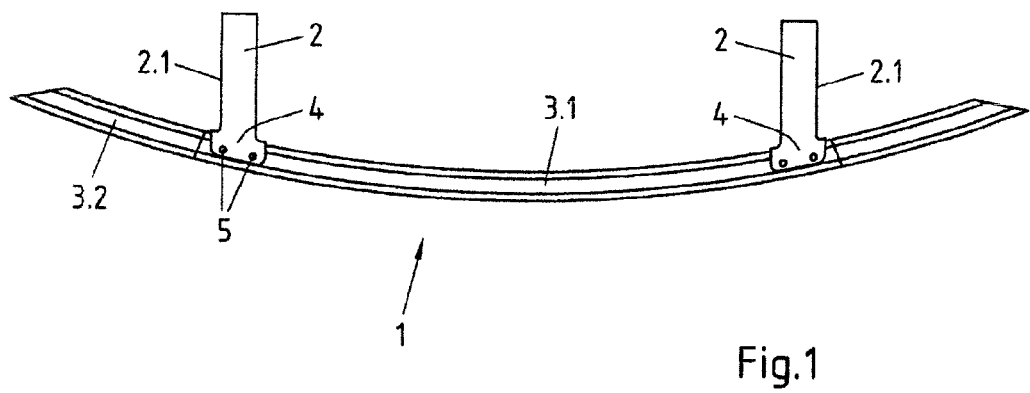
FIG. 1 is a top schematic plan view of an embodiment of a bumper for a motor vehicle, the bumper having two shock-absorbing deformation bodies (crash boxes), as disclosed herein.

Disclosed herein is a bumper for a motor vehicle having at least two deformation bodies that are at a distance from one another, and of which the center or longitudinal axes, in the mounted state, are oriented substantially parallel to the direction of travel of the motor vehicle, and having a plurality of crossmembers which have a closed profile and which are arranged one above the other and are connected to the deformation bodies (so-called crash boxes). The bumper according to the invention is characterized in that the crossmembers of said bumper are formed from a group of at least three crossmembers, wherein the respective crossmember of the group has a cross-sectional profile which comprises at least five corners. In this case, the crossmember preferably has a cross-sectional profile with an even number of corners, for example six or eight corners.

The solution according to the invention is based on the knowledge that, in respect of a typical collision at a speed of less than 20 km/h, a deliberately limited backward displacement of the crossmember region of the bumper and a high degree of reliability against the vehicle being underrun or overrun the bumper and additionally an increased reduction in the weight of the bumper can be achieved when a bumper of the kind cited in the introductory part has at least three crossmembers with a cross-sectional profile which comprises at least five corners, instead of crossmembers with a conventional cross-sectional profile, such as a rectangular, round or oval cross-sectional profile for example. Increasing the number of profile corners or correspondingly increasing the number of different radii of the cross-sectional profile results in an increase (improvement) in the bending resistance of the crossmember in question and therefore of the entire bumper.

A bumper of the present disclosure meets the requirements of the abovementioned crash repair test which was developed by the insurance sector and is additionally distinguished by a relatively low weight together with a high level of deformation resistance.

In particular, the use of crossmembers which comprise a cross-sectional profile having six, eight or a higher, even number of corners has the advantage that three or more of the crossmembers can then be arranged one above the other in a substantially straight row and, in the process, can be placed flat one on the other. As an alternative, the crossmembers can be arranged one above the other and at a distance from one another in the bumper according to the invention. The crossmembers can be connected to one another by suitable connection and/or fastening means, such as pins and/or bolts for example.

The deformation bodies and the crossmembers of the bumper according to the invention are preferably manufactured from steel. Steel is distinguished, in particular, by good cold forming properties and proven and cost-effective suitability for welding. In addition, the material steel provides the option of realizing higher strengths than aluminum for example. It is also feasible to use, as crossmembers, heat-treatable steels, such as manganese-boron steels for example, which can be hardened throughout or can have locally different strengths. All of the crossmembers are preferably produced from steel and have a tensile strength of at least 780 MPa. At least one of the crossmembers of the bumper according to the invention is preferably produced from high-strength steel with a tensile strength of at least 1200 MPa, preferably of at least 1400 MPa.

Depending on requirements and with a view to a relatively low weight, different material grades and/or wall thicknesses can be used. In particular, at least one of the crossmembers can be produced with a lower wall thickness (0.9 times the wall thickness of the crossmember with the highest wall thickness) by using steels with tensile strengths of at least 780 MPa. If steels with tensile strengths of at least 1200 MPa are taken into consideration, the wall thickness can be further reduced, at least by or to 0.6 times, preferably 0.7 times, the wall thickness of the crossmember with the highest (greatest) wall thickness.

A further preferred refinement of the bumper according to the invention makes provision for at least the topmost crossmember to end at the outer sides of the deformation bodies. This length boundary of the topmost crossmember or of at least one further crossmember of the other crossmembers serves the objective of minimizing the weight of the bumper. In this case, the crossmember in question can end at a short distance from the outer side of the respective deformation body. In this case, the distance or projection of the end of the crossmember in relation to the outer side of the deformation body is preferably smaller than or equal to the outside diameter or the greatest profile external width of the crossmember in question. The longitudinal extent of the topmost crossmember particularly preferably terminates substantially flush with the two outer sides of the deformation bodies.

According to a further advantageous refinement of the bumper according to the invention, provision is made for the deformation resistance and/or the tensile strength of the crossmembers to reduce in steps from the topmost crossmember in the direction of the bottommost crossmember or to be substantially identical. As a result, it is possible for the material costs of the bumper according to the invention to be reduced and nevertheless for the requirements of the abovementioned crash repair test which was developed by the insurance sector to be met.

According to a further (alternative) refinement of the bumper according to the invention, provision is made for the deformation resistance of the topmost crossmember and the deformation resistance of the bottommost crossmember to each be greater than the deformation resistance of each of the crossmembers which are arranged therebetween. As a result, it is possible for the material costs of the bumper according to the invention to be reduced and nevertheless for the requirements of the abovementioned crash repair test which was developed by the insurance sector to be met.

A further advantageous refinement of the bumper according to the invention is characterized in that at least two of the crossmembers are at least locally connected to one another between the deformation bodies. As a result, the deformation resistance of the bumper can be further increased. In this case, the local connection between the crossmembers can preferably be formed from one or more spot welding connections. In order to improve the deformation resistance of the bumper, all crossmembers can also be locally connected to one another. Spot welding connections can be made by means of resistance welding, but also by MIG (Metal Inert Gas) and MAG (Metal Active Gas) welding. As an alternative, at least two crossmembers, but also all crossmembers of the bumper according to the invention, can be connected to one another by one or more spots of adhesive or else by adhesive bonding over the entire surface.

In respect of low manufacturing costs, a further preferred refinement of the bumper according to the invention makes provision for the crossmembers or at least one of the crossmembers to be designed as a rolled profile, optionally as a bent rolled profile. According to an alternative refinement of the bumper according to the invention, the crossmembers or at least one of the crossmembers can also be produced from a plurality of shaped sheet metal parts, wherein the longitudinal edges of the respective crossmember are welded to one another using a butt joint or lap joint. The last-mentioned refinement provides the possibility of the crossmembers in question being assembled in a tailored manner from metal sheets or shaped sheet metal parts of different wall thicknesses and/or different material grades. As an alternative, shaping to form a crossmember can also be performed from a sheet metal blank which is initially pre-formed into a U-shaped profile and then further shaped into a closed slotted profile. As a next manufacturing step, the longitudinal edges of the slotted profile are welded using a butt joint or lap joint.

A further advantageous refinement of the bumper according to the invention is characterized in that at least one of the crossmembers differs from at least one of the other crossmembers in respect of its cross-sectional shape. The deformation resistance of the bumper can also be increased and/or the weight of said bumper can also be reduced in this way.

If the number of crossmembers meets the required minimum height of the bumper and a further increase in the deformation resistance is required, remedial action can be provided according to a further refinement of the bumper according to the invention by at least one of the crossmembers being foamed with structural foam. As an alternative, further crossmembers can be arranged in front of and/or behind the crossmembers which are arranged one above the other.

Further preferred and advantageous refinements of the bumper according to the invention, in particular of the front bumper, are indicated in the dependent claims.

Various embodiments of the present disclosure are discussed in further detail below with reference to the attached drawing figures.

FIG. 1 illustrates a bumper 1 for a motor vehicle, which bumper is intended, in particular, for use as a front bumper.

The bumper 1 comprises two deformation bodies 2 which can also be called crash boxes. The center or longitudinal axes of said deformation bodies are oriented substantially parallel to the direction of travel, that is to say the longitudinal direction, of the motor vehicle. The deformation bodies 2 are fastened to longitudinal supports or other parts of the vehicle body. In the illustrated exemplary embodiment, the hollow deformation bodies 2 have a substantially rectangular cross-sectional profile. As an alternative, said deformation bodies can also be designed, for example, with an oval or round cross-sectional profile.

Furthermore, the bumper 1 comprises at least three crossmembers 3.1, 3.2, 3.3 which are arranged one above the other in parallel and are connected to the deformation bodies 2 by means of suitable fastening means. The crossmembers 3.1, 3.2, 3.3 each have at least one pentagonal, preferably hexagonal or octagonal, cross-sectional profile. Said crossmembers comprise, for example, individual closed profiles.

In the exemplary embodiments which are illustrated in FIGS. 1 to 4, the bumper 1 has in each case four crossmembers (hexagonal or octagonal profiles) 3.1, 3.2, 3.3, 3.4 which are arranged one above the other in parallel. However, said bumper may possibly also be provided with more than four or only with three crossmembers 3.1, 3.2, 3.3 which have a hexagonal or octagonal cross-sectional profile.

The connection between the crossmembers 3.1, 3.2, 3.3, 3.4 and the deformation bodies (crash boxes) 2 is designed, for example, as a releasable connection, for example by screw connections. To this end, fastening means 4 are provided on the front end sides of the deformation bodies 2. The fastening means 4 comprise, for example, bracket-like holding means or webs which are fastened to or integrally formed on the respective deformation body 2 and have holes for receiving screw bolts 5 or the like which can be connected to the crossmembers 3.1, 3.2, 3.3, 3.4.

The bottommost crossmember 3.4 differs from at least one of the other crossmembers 3.1, 3.2, 3.3 in respect of its wall thickness and possibly material grade in that it has a lower wall thickness than the other crossmembers 3.1, 3.2, 3.3, wherein, in order to reduce the weight, the wall thickness of the crossmember 3.4 corresponds at least to 0.6 times and at most 0.9 times the wall thickness of the crossmember 3.1, 3.2 or 3.3 with the largest (highest) wall thickness. At least one of the crossmembers 3.1, 3.2, 3.3, 3.4 is preferably produced from a high-strength steel which has a tensile strength of at least 1200 MPa, preferably at least 1400 MPa.

In order to further minimize the weight of the bumper 1, the topmost crossmember 3.1 is shorter than the crossmembers 3.2, 3.3, 3.4 which are arranged below it. Accordingly, the topmost crossmember 3.1 ends at the outer side 2.1 of the crash boxes (deformation bodies) 2, wherein it preferably terminates substantially flush with the outer side 2.1 of the crash boxes 2 or the outer side 2.1 of the crash boxes 2 project at the sides by a short distance (cf. FIGS. 1 to 3).

In order to further increase the resistance of the structure, the crossmembers are locally connected to one another if required. This is realized, for example, by one or more spot welding connections 6 (cf. FIG. 4). As an alternative, this local connection can also be realized by an interlocking connection by means of socket bolts or latching elements. In order to further increase the deformation resistance, all crossmembers 3.1, 3.2, 3.3, 3.4 of the bumper 1 can be locally connected to one another or, as illustrated in the exemplary embodiment, can be connected to one another over the entire surface by means of an adhesive layer 12.

The crossmembers 3.1, 3.2, 3.3, 3.4 of the bumper 1 according to the invention differ from one another in respect of their deformation resistance and/or their strength, for example, by the deformation resistance and/or the tensile strength of the crossmembers decreasing in steps from the topmost crossmember 3.1 in the direction of the bottommost crossmember 3.4 or being substantially identical.

However, as an alternative, the crossmembers 3.1, 3.2, 3.3, 3.4 of the bumper 1 according to the invention can also be designed in such a way that the deformation resistance of the topmost crossmember 3.1 and of the bottommost crossmember 3.4 are each greater than the deformation resistance of the crossmember or crossmembers 3.2, 3.3 which is/are arranged therebetween.

Both continuous and discontinuous shaping methods can be used to produce the crossmembers or profiles 3.1, 3.2, 3.3, 3.4. By way of example, the crossmembers 3.1, 3.2, 3.3, 3.4 can be produced as closed rolled profiles by continuously rolling sheet metal strips (slit strips). However, as an alternative, the crossmembers 3.1, 3.2, 3.3, 3.4 can each also be produced as shaped parts discontinuously by deep drawing or another suitable shaping method and subsequent welding of the longitudinal edges, which are arranged with a butt joint or lap joint, of the sheet metal shells which are obtained by shaping.

Figure 2:
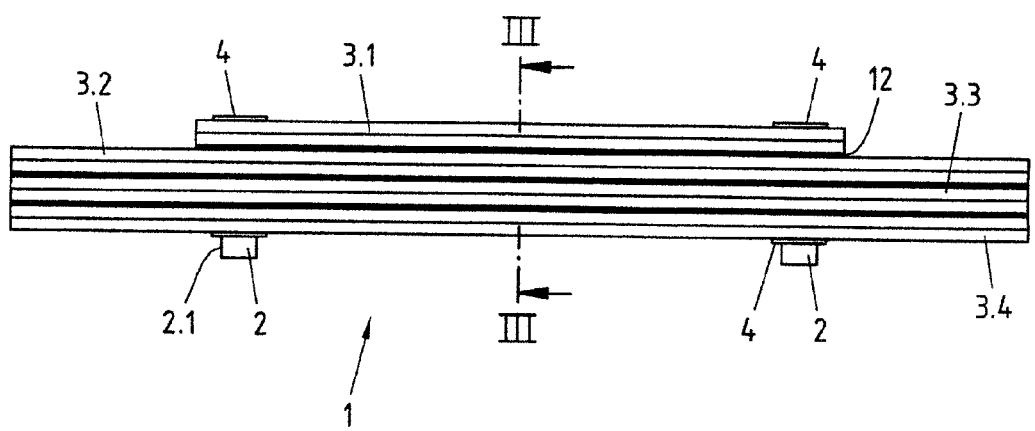
FIG. 2 is a front view of the bumper of FIG. 1.
Figure 3:
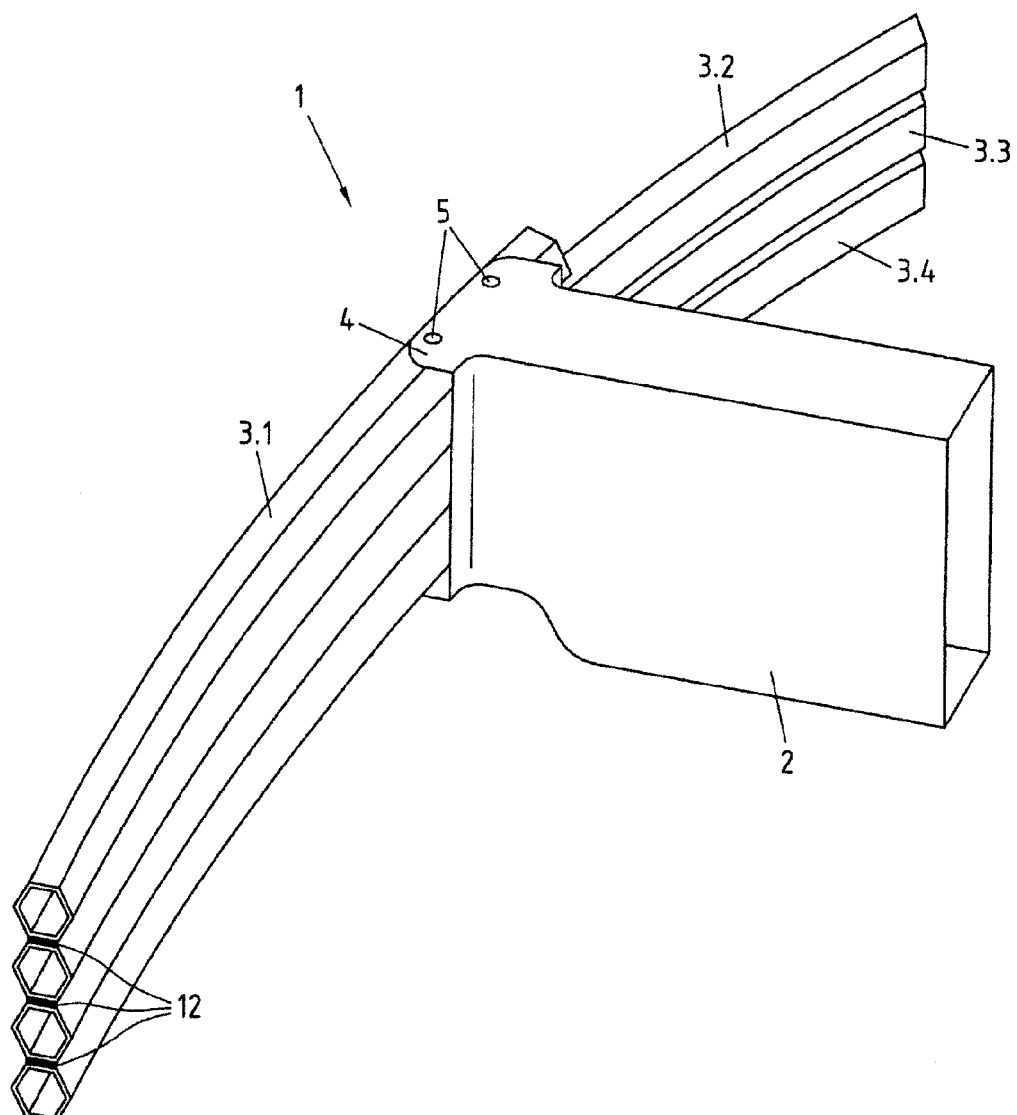
FIG. 3 is a partial perspective section view through the bumper of FIG. 1, taken along section line in FIG. 2.
Figure 4:
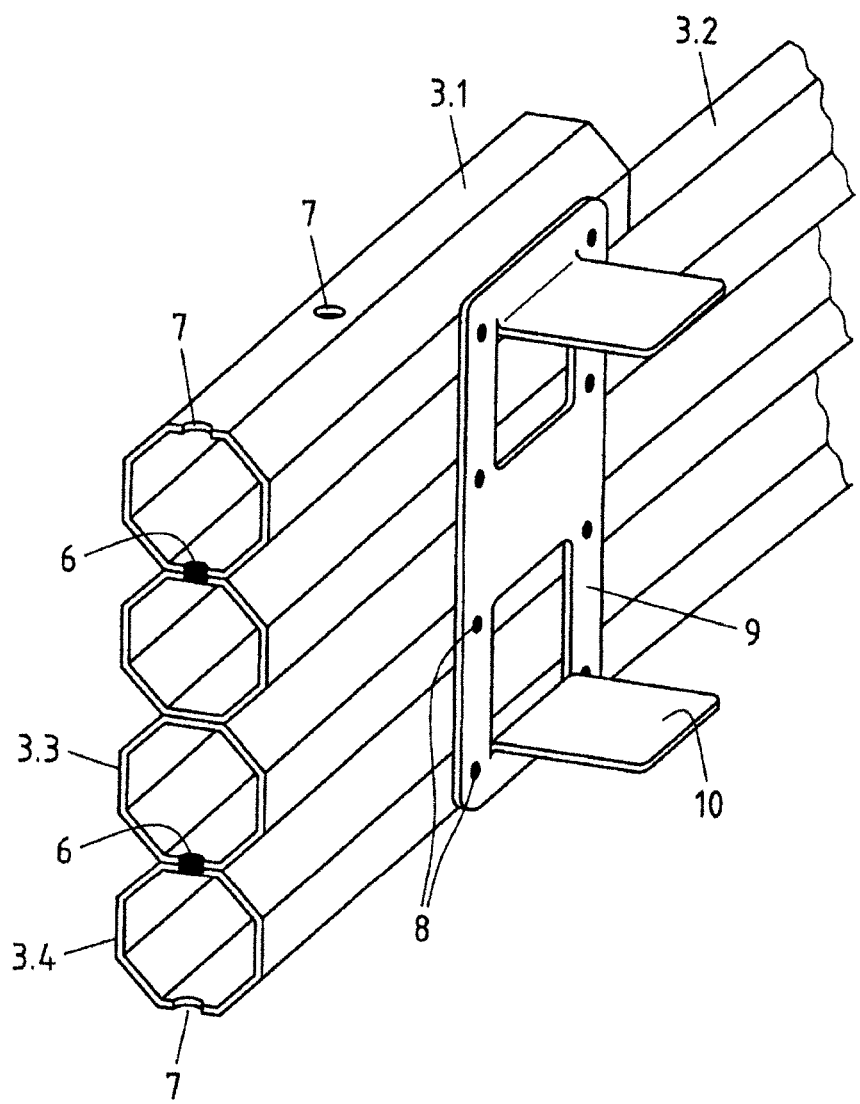
FIG. 4 is a partial perspective sectional detail view through an alternate embodiment of a bumper of the present disclosure.

FIG. 4 illustrates a further exemplary embodiment of a bumper according to the invention. The structure of the bumper according to FIG. 4 is similar to the first exemplary embodiment which is illustrated in FIGS. 1 to 3, but with the difference that the crossmembers each have an octagonal cross-sectional profile and are locally welded to one another. In order to weld the crossmembers to one another, a suitable welding apparatus is, for example, passed through at least one opening 7 in the profile wall of the crossmember (profile) in question to the welding point. Furthermore, an impact plate 9 is preferably connected to the crossmembers 3.1, 3.2, 3.3, 3.4 by spot welding points 8. The impact plate 9 has bent-away lugs 10 which serve as the connection region to a deformation body, not illustrated in FIG. 4. The impact plate 9 is connected to the deformation bodies by means of screwing or welding.

Figures 5A, 6:
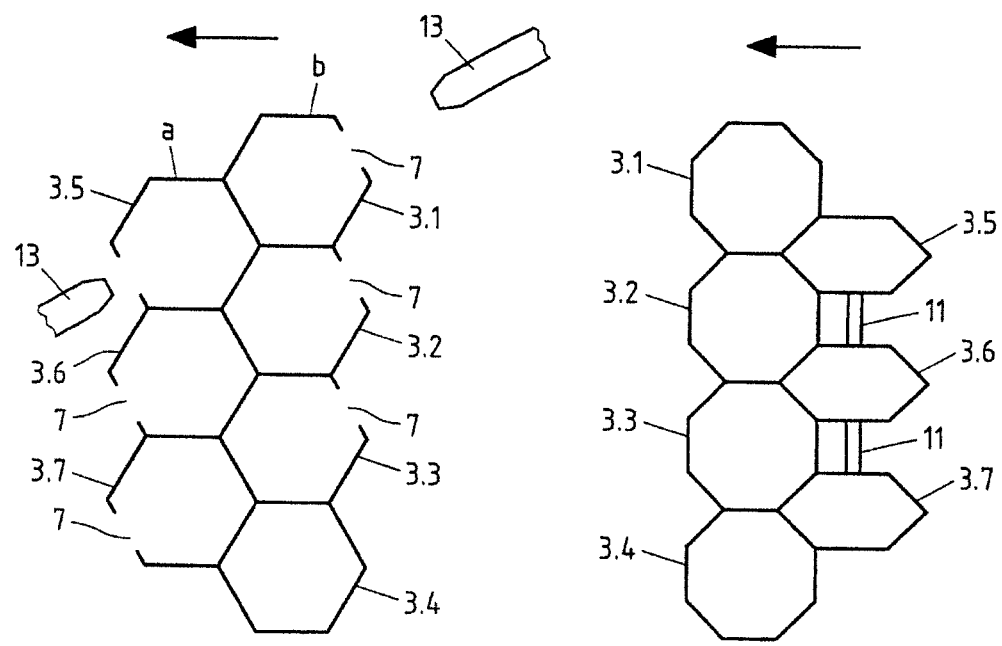
Figures 5B, 7:
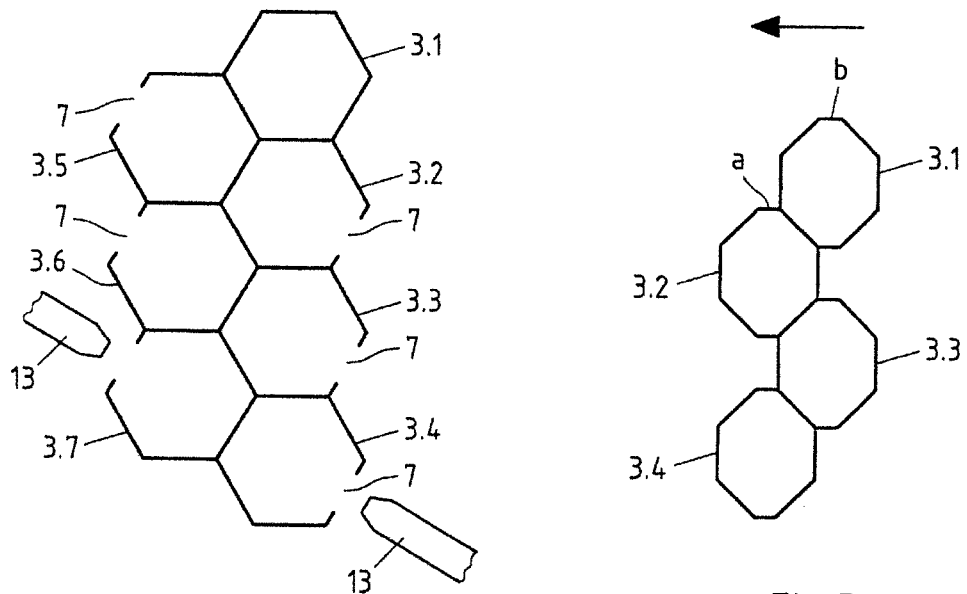

FIGS. 5a, 5b and 6 outline further exemplary embodiments of the bumper 1 according to the invention, wherein further crossmembers 3.5, 3.6, 3.7 are each arranged in front of or behind the crossmembers 3.1, 3.2, 3.3, 3.4, which are arranged substantially vertically one above the other, as seen in the direction of travel of the motor vehicle, in order to increase the bending resistance.

The exemplary embodiment according to FIGS. 5a and 5b illustrates a crossmember arrangement 3.1, 3.2, 3.3, 3.4 as is shown in FIGS. 1 to 3, but without an adhesive layer. In the direction of travel, indicated by the arrow, three further crossmembers 3.5, 3.6, 3.7 are arranged in front of the crossmember arrangement 3.1, 3.2, 3.3, 3.4 and are connected to the crossmember arrangement. In contrast to FIG. 4, the crossmembers 3.1 to 3.7 are not connected to one another vertically, but rather the connection is provided on the obliquely running, adjoining sides of the crossmembers 3.1 to 3.7, for example by means of spot welding, in this case. The spot welding is performed by means of openings 7 through which welding tongs 13, illustrated by way of example, can be passed as far as the obliquely running sides, which are to be connected, of the crossmembers 3.1 to 3.7. The side edges of the crossmembers in the substantially horizontal plane, which are respectively identified by reference symbols a and b, can indeed be selected to be somewhat smaller than the other side edges (sides) of the crossmembers taking into account the bending resistance, as a result of which installation space can accordingly also be obtained. In a further refinement of this exemplary embodiment, at least one of the crossmembers 3.1, 3.2, 3.3, 3.4, 3.5, 3.6 and/or 3.7 of the bumper 1 according to FIG. 5 can differ from the other crossmembers in respect of its wall thickness. At least one of the crossmembers 3.1 to 3.7 is produced from a steel with a tensile strength of at least 780 MPa, in particular at least 1200 MPa, preferably at least 1400 MPa. The wall thickness of the crossmember with the abovementioned tensile strength corresponds to 0.6 times, preferably 0.7 times and at most 0.9 times, the wall thickness of the other crossmembers.

In the exemplary embodiment according to FIG. 6, further crossmembers 3.5, 3.6, 3.7 are arranged behind the crossmember arrangement 3.1, 3.2, 3.3, 3.4 as viewed in the direction of travel. Depending on requirements, the further crossmembers 3.5, 3.6, 3.7 which are at a vertical distance from one another can be at least locally connected to one another, for example by one or more screw connections or other suitable connection means 11.

In contrast to FIG. 4, FIG. 7 shows a further exemplary embodiment of an offset arrangement of the crossmembers 3.1 to 3.4 one above the other. Furthermore, the side edges a, b with the substantially horizontal orientation are reduced to a relatively small or minimum extent, without having a negative effect on the shortening of the side edges. If required, still further crossmembers can be provided one above the other in an offset arrangement.

The implementation of the invention is not restricted to the exemplary embodiments illustrated in the drawing. Instead, a large number of variants are feasible, these variants also making use of the invention indicated in the claims in a design which differs from the illustrated exemplary embodiments.

The invention claimed is:

1. A bumper for a motor vehicle, comprising:
at least a first and a second steel deformation body, each having a longitudinal axis, said first and second deformation bodies being spaced apart from one another and configured to be mounted to the motor vehicle such that said longitudinal axes of said respective first and second deformation bodies are oriented substantially parallel to a direction of travel of the motor vehicle;
at least three steel crossmembers defining a first group of crossmembers, each of said at least three crossmembers having a closed profile and a cross-sectional shape that comprises at least six corners, said at least three cross members being disposed one above the other and coupled to said at least two deformation bodies.

2. The bumper of claim 1, wherein the cross-sectional shape of said cross members has an even number of corners.

3. The bumper of claim 1, wherein the cross-sectional shape of said cross members is octagonal.

4. The bumper of claim 1, further comprising:
a plurality of additional crossmembers defining a second group of crossmembers, said additional crossmembers being disposed at least one of in front of or behind said first group of cross members.

5. The bumper of claim 1, wherein each of said crossmembers in said first group and said second group are made of steel, and each has a tensile strength of at least 780 MPa.

6. The bumper of claim 1, wherein at least one of said crossmembers in said first group or said second group are made of steel having a tensile strength of at least 1,200 MPa.

7. The bumper of claim 1, wherein each of said cross members has a first end and an opposing second end that is distal from said first end, wherein each of said first and second deformation bodies has an outer side facing away from said respective other deformation body, and wherein said first end of at least an uppermost crossmember in said first group is aligned with said outer side of said first deformation body, and wherein said second end of at least said uppermost crossmember in said first group is aligned with said outer side of said second deformation body.

8. The bumper of claim 1, wherein at least one of a deformation resistance or a tensile strength of said crossmembers in said first group decreases in steps from an uppermost crossmember to a lowermost crossmember.

9. The bumper of claim 1, wherein a deformation resistance of each of an uppermost crossmember and a lowermost crossmember in said first group of cross members is greater than the deformation resistance of a crossmember disposed there between.

10. The bumper of claim 1, wherein at least two of the three crossmembers are at least locally coupled to each other at a location disposed between said first and second deformation bodies.

* * * * *